(12) United States Patent
Bauknecht et al.

(10) Patent No.: US 10,563,559 B2
(45) Date of Patent: Feb. 18, 2020

(54) EXHAUST GAS AFTERTREATMENT SYSTEM, AND INTERNAL COMBUSTION ENGINE WITH EXHAUST GAS AFTERTREATMENT SYSTEM

(71) Applicant: MTU FRIEDRICHSHAFEN GMBH, Friedrichshafen (DE)

(72) Inventors: Mathias Bauknecht, Tettnang (DE); Michael Engelhardt, Leutkirch (DE); Boban Maletic, Friedrichshafen (DE); Samuel Vogel, Bad Waldsee (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/770,397

(22) PCT Filed: Oct. 6, 2016

(86) PCT No.: PCT/EP2016/001656
§ 371 (c)(1),
(2) Date: Apr. 23, 2018

(87) PCT Pub. No.: WO2017/067636
PCT Pub. Date: Apr. 27, 2017

(65) Prior Publication Data
US 2018/0313247 A1    Nov. 1, 2018

(30) Foreign Application Priority Data

Oct. 21, 2015 (DE) .................. 10 2015 220 532

(51) Int. Cl.
*F01N 13/18* (2010.01)
*F01N 13/00* (2010.01)
(Continued)

(52) U.S. Cl.
CPC ........... *F01N 13/017* (2014.06); *F01N 3/208* (2013.01); *F01N 3/2066* (2013.01); *F01N 13/18* (2013.01);
(Continued)

(58) Field of Classification Search
CPC ...... F01N 1/084; F01N 3/2892; F01N 13/009; F01N 13/0097; F01N 13/017;
(Continued)

(56) References Cited

U.S. PATENT DOCUMENTS

| | | |
|---|---|---|
| 5,325,666 A | 7/1994 | Rutschmann |
| 8,596,049 B2 | 12/2013 | Isada et al. |

(Continued)

FOREIGN PATENT DOCUMENTS

| | | |
|---|---|---|
| DE | 4024801 A1 | 2/1992 |
| DE | 102005021194 A1 | 9/2006 |

(Continued)

*Primary Examiner* — Jonathan R Matthias
(74) *Attorney, Agent, or Firm* — Lucas & Mercanti, LLP; Klaus P. Stoffel

(57) ABSTRACT

An exhaust gas aftertreatment system with an exhaust gas inlet, at least two exhaust gas aftertreatment elements, and a flow chamber. The exhaust gas inlet, the at least two exhaust gas aftertreatment elements, and the flow chamber are arranged relative to one another and fluidically connected together such that exhaust gas flowing through the exhaust gas inlet into the flow chamber can be distributed to the at least two exhaust gas aftertreatment elements. The exhaust gas passes through at least one first of the at least two exhaust gas aftertreatment elements along a first flow direction, and the exhaust gas passes through at least one second of the at least two exhaust gas aftertreatment elements along a second flow direction, wherein the first flow direction and the second flow direction are oriented at least diagonally to each other, preferably anti-parallel to each other.

7 Claims, 2 Drawing Sheets

(51) Int. Cl.
*F01N 3/20* (2006.01)
*F01N 3/28* (2006.01)

(52) U.S. Cl.
CPC ........ *F01N 3/2892* (2013.01); *F01N 2240/20* (2013.01); *F01N 2260/06* (2013.01); *F01N 2450/30* (2013.01); *F01N 2470/18* (2013.01); *F01N 2490/00* (2013.01); *F01N 2610/02* (2013.01); *F01N 2610/1453* (2013.01); *Y02T 10/24* (2013.01)

(58) Field of Classification Search
CPC .. F01N 13/18; F01N 2240/20; F01N 2450/30; F01N 2490/06
See application file for complete search history.

(56) References Cited

U.S. PATENT DOCUMENTS

| | | | |
|---|---|---|---|
| 8,747,788 B1 | 6/2014 | Baig | |
| 2010/0050618 A1* | 4/2010 | Huthwohl et al. | F01N 3/083 60/299 |
| 2013/0067891 A1* | 3/2013 | Hittle | F01N 3/103 60/274 |
| 2017/0037761 A1 | 2/2017 | Wehler et al. | |

FOREIGN PATENT DOCUMENTS

| | | |
|---|---|---|
| DE | 102010027293 A1 | 1/2012 |
| DE | 112010004962 T5 | 11/2012 |
| DE | 102013015602 A1 | 3/2015 |
| DE | 102014005303 A1 | 10/2015 |
| JP | 2012067635 A | 4/2012 |
| WO | 9202715 A1 | 2/1992 |
| WO | 2013188728 A1 | 12/2013 |

* cited by examiner

EXHAUST GAS AFTERTREATMENT SYSTEM, AND INTERNAL COMBUSTION ENGINE WITH EXHAUST GAS AFTERTREATMENT SYSTEM

CROSS-REFERENCE TO RELATED APPLICATIONS

The present application is a 371 of International application PCT/EP2016/001656, filed Oct. 6, 2016, which claims priority of DE 10 2015 220 532.0, filed Oct. 21, 2015, the priority of these applications is hereby claimed and these applications are incorporated herein by reference.

BACKGROUND OF THE INVENTION

The invention relates to an exhaust gas aftertreatment system and an internal combustion engine with such an exhaust gas aftertreatment system.

It is known in principle in the case of exhaust gas aftertreatment systems to guide exhaust gas through an exhaust gas inlet into a flow guiding chamber, from which the exhaust gas flows to at least one exhaust gas aftertreatment element. It is possible that the exhaust gas in the flow guiding chamber flows to and passes through two or more exhaust gas aftertreatment elements, which are oriented parallel to one another, in a specific direction of flow. If an active volume of the exhaust gas aftertreatment elements, in particular a catalytic converter volume, is supposed to be increased, it is necessary in the case of this concept to elongate the installation length of the exhaust gas aftertreatment elements. As a result of this, a loss of pressure increases via the exhaust gas aftertreatment elements which is inexpedient for operation of an internal combustion engine which has the exhaust gas aftertreatment system.

SUMMARY OF THE INVENTION

The object on which the invention is based is to create an exhaust gas aftertreatment system and an internal combustion engine, wherein the stated disadvantages do not arise.

The object is achieved in particular in that an exhaust gas aftertreatment system is created which has an exhaust gas inlet and at least two exhaust gas aftertreatment elements as well as a flow guiding chamber. The exhaust gas aftertreatment system is characterized in that the exhaust gas inlet, the at least two exhaust gas aftertreatment elements and the flow guiding chamber are arranged relative to one another and fluid-connected to one another such that exhaust gas flowing through the exhaust gas inlet into the flow guiding chamber can be divided between the at least two exhaust gas aftertreatment elements, wherein the exhaust gas passes through at least a first of the at least two exhaust gas aftertreatment elements along a first direction of flow, wherein the exhaust gas passes through at least a second of the at least two exhaust gas aftertreatment elements along a second direction of flow, wherein the first direction of flow and the second direction of flow are oriented at least obliquely to one another, preferably in an anti-parallel manner to one another. This means in particular that two vectors which indicate the directions of flow have an angle to one another of more than 0°, preferably at least 90°, wherein they are particularly preferably oriented oppositely to one another, in particular therefore enclose an angle of 180° with one another. As a result of this, it is possible to allow the exhaust gas flowing into the flow guiding chamber through the at least two exhaust gas aftertreatment elements in different directions, wherein the active volume, which is available overall, of the exhaust gas aftertreatment elements, in particular a catalytic converter volume, is divided between two different flow paths along the two directions of flow. As a result of this, the catalytic converter volume can be advantageously increased without the installation length of an individual exhaust gas aftertreatment element having to be lengthened as a result of this and thus the pressure loss having to be increased. Rather, a large incoming flow surface, in particular a doubled incoming flow surface in terms of a conventional configuration, can advantageously be provided without an increase in the pressure loss in the exhaust gas aftertreatment system occurring. A reduction in the pressure loss is even preferably possible as a result of the enlarged incoming flow surface. Half of the exhaust gas mass flow can preferably be conducted through the exhaust gas aftertreatment system in a second direction of flow which is opposite to the first direction of flow without large differences arising in the mass flow equal distribution in relation to the division of the direction of flow and counterdirection of flow. In the case of one configuration of at least one exhaust gas aftertreatment element as a catalytic converter for selective catalytic reduction of nitrogen oxides, an equal distribution of mass flow and reducing agent is well represented via the catalytic converter surface.

In the case of one preferred exemplary embodiment, it is provided that the exhaust gas aftertreatment system has more than two exhaust gas aftertreatment elements. In particular, the exhaust gas aftertreatment system is preferably scalable in relation to the number of exhaust gas aftertreatment elements encompassed by it, in particular can be adjusted to a size or nominal output of an internal combustion engine with which the exhaust gas aftertreatment system is operated.

One exemplary embodiment of the exhaust gas aftertreatment system is particularly preferred, in the case of which eight exhaust gas aftertreatment elements are provided in pairs in such a manner that exhaust gas passes through in each case four exhaust gas aftertreatment elements along the first direction of flow and four other exhaust gas aftertreatment elements along the second direction of flow. In each case two exhaust gas aftertreatment elements are particularly preferably arranged oppositely in pairs.

According to a further development of the invention, it is provided that the at least two exhaust gas aftertreatment elements have in each case an exhaust gas inlet facing the flow guiding chamber, wherein a first exhaust gas inlet of the first exhaust gas aftertreatment element is arranged on a first side of the flow guiding chamber, and wherein a second exhaust gas inlet of the second exhaust gas aftertreatment element of the at least two exhaust gas aftertreatment elements is arranged on a second side of the flow guiding chamber opposite the first side. The flow guiding chamber therefore has two sides or two ends, wherein the first exhaust gas inlet of the first exhaust gas aftertreatment element of the at least two exhaust gas aftertreatment elements is arranged in the region of the first end of the flow guiding chamber, and wherein the second exhaust gas inlet of the second exhaust gas aftertreatment element of the at least two exhaust gas aftertreatment elements is arranged in the region of the second, opposite end of the flow guiding chamber. Both exhaust gas aftertreatment elements are therefore arranged opposite one another in relation to their exhaust gas inlets so that the exhaust gas flow can be divided between these in antiparallel or oppositely oriented directions of flow.

It is preferably provided that the exhaust gas aftertreatment elements open in each case with their exhaust gas inlets into the flow guiding chamber. A geometrically simple design, which can be produced at low cost, of the exhaust gas aftertreatment system is provided in general with this configuration, in which design the exhaust gas flow can be divided in an antiparallel manner between the at least two exhaust gas aftertreatment elements.

The exhaust gas inlet is preferably in fluid connection with the flow guiding chamber via an exhaust gas guiding pipe. The exhaust gas guiding pipe is preferably set up as a mixing and/or preparation section for mixing and/or preparing a reaction agent for conversion at a catalytic converter, in particular a reducing agent or a reducing agent precursor product, for example, a urea solution. In this manner, in particular an integrated mixing/preparation section is provided which enables as high as possible a temperature during the preparation of the reaction agent.

According to one further development of the invention, it is provided that the exhaust gas aftertreatment system has an exhaust gas aftertreatment container, wherein the exhaust gas aftertreatment container has the exhaust gas inlet, the at least two exhaust gas aftertreatment elements and the flow guiding chamber. The exhaust gas aftertreatment container is preferably formed as an exhaust gas box or gas box and represents a closed vessel, through which flow is possible, with the exhaust gas inlet and at least one exhaust gas outlet, wherein exhaust gas can flow through the exhaust gas inlet into the exhaust gas aftertreatment container, this along a specific flow path, along which it passes at least one exhaust gas aftertreatment element, to the at least one exhaust gas outlet and can leave the exhaust gas aftertreatment container again there. The exhaust gas aftertreatment container represents a structurally simple, integral configuration of the exhaust gas aftertreatment system, wherein this can be mounted in particular in an expedient, compact and installation space-saving manner in the region of an internal combustion engine or on an internal combustion engine.

Preferably at least two flow paths, which are oriented in particular obliquely, preferably in an antiparallel manner to one another, are formed in the exhaust gas aftertreatment container, wherein in each case a flow path comprises one of the at least two exhaust gas aftertreatment elements. A separate outlet chamber is preferably assigned to each flow path, into which outlet chamber in each case an exhaust gas outlet opens so that exhaust gas can escape from the exhaust gas outlet chamber via the exhaust gas outlet from the exhaust gas aftertreatment container. Due to the fact that a separate exhaust gas outlet is assigned to each flow path, a pressure loss via the exhaust gas aftertreatment system can be further reduced. It is of course also alternatively possible in a structurally simple and low-cost manner to combine the exhaust gas coming from the various flow paths in a common exhaust gas outlet chamber and leave the exhaust gas aftertreatment container via a single exhaust gas outlet.

According to one further development of the invention, it is provided that the at least two exhaust gas aftertreatment elements are arranged in at least one interchangeable plug-in module in the exhaust gas aftertreatment container. In this manner, a very simple and expedient changing concept can be achieved for the exhaust gas aftertreatment elements so that these can be easily and rapidly changed at the end of a predetermined life span or in the event of excessive contamination or for the purpose of cleaning. To this end, the exhaust gas aftertreatment container particularly preferably has a retaining pipe in which an interchangeable plug-in module can be received. The interchangeable plug-in modules can be fastened in a manner known per se with a cover and a V-belt strap, or in another suitable manner, on the retaining pipe and/or on the exhaust gas aftertreatment container. At least one exhaust gas aftertreatment element is preferably mounted—in particular by means of a wire mesh ring—in each interchangeable plug-in module.

The exhaust gas aftertreatment container preferably has inner walls on which the interchangeable plug-in modules and/or the retaining lugs are retained, wherein the inner walls preferably additionally delimit different chambers of the exhaust gas aftertreatment container, in particular an exhaust gas inlet chamber, the flow guiding chamber and/or the at least one exhaust gas outlet chamber from one another. In this manner, a mixing of untreated exhaust gas with aftertreated exhaust gas can be avoided.

It is possible that precisely two exhaust gas aftertreatment elements or also more than two exhaust gas aftertreatment elements are arranged in an interchangeable plug-in module.

According to one further development of the invention, it is in particular provided that the exhaust gas aftertreatment container has at least one interchangeable plug-in module which has the at least two exhaust gas aftertreatment elements which are arranged spaced apart from one another, as seen in the longitudinal direction of the interchangeable plug-in module, wherein the interchangeable plug-in module has an inflow chamber which is open at the edge in regions between the exhaust gas aftertreatment elements, i.e. where these are spaced apart from one another. In this manner, the division of the exhaust gas flow can be carried out in a structurally very simple and compact manner within the interchangeable plug-in module. The inflow chamber in the mounted state of the interchangeable plug-in module is preferably in fluid connection with the flow guiding chamber. In particular the interchangeable plug-in module is preferably pushed into the exhaust gas aftertreatment container and mounted thereon in such a manner that the inflow chamber is arranged in the flow guiding chamber, wherein at least one region, which is open at the edge, thereof opens towards the flow guiding chamber. Exhaust gas can then flow from the flow guiding chamber into the inflow chambers and is divided there between the two exhaust gas aftertreatment elements, namely preferably along opposing directions of flow. In the case of such a configuration, it is in particular possible to introduce all the interchangeable plug-in modules of the exhaust gas aftertreatment system from precisely one side into the exhaust gas aftertreatment container. No multi-side access to the exhaust gas aftertreatment container is required.

According to one further development of the invention, it is provided that the exhaust gas aftertreatment container has at least two interchangeable plug-in modules, wherein at least one interchangeable plug-in module has at least one, preferably precisely one exhaust gas aftertreatment element, preferably without an inflow chamber. It is particularly preferably provided that two interchangeable plug-in modules are provided, of which one has the first of the at least two exhaust gas aftertreatment elements and another has the second of the at least two exhaust gas aftertreatment elements. Both exhaust gas aftertreatment elements, through which flow occurs along the at least two different directions of flow, are thus assigned to different interchangeable plug-in modules. Both interchangeable plug-in modules preferably open into the flow guiding chamber so that the exhaust gas flow proceeding from the flow guiding chamber is divided between the two interchangeable plug-in modules and thus between the at least two exhaust gas aftertreatment elements, in the different directions of flow. The interchangeable plug-in modules can have a shorter configuration than when they have in each case two exhaust gas aftertreatment elements and an inflow chamber, which simplifies sealing of the interchangeable plug-in modules. An installation length of the exhaust gas aftertreatment container can furthermore be shortened in particular because the inflow chamber of the interchangeable plug-in modules can be omitted.

According to one further development of the invention, it is provided that the exhaust gas aftertreatment container has at least two plug-in receivers for interchangeable plug-in modules on precisely one outer wall. An outer wall is to be understood here in particular as a wall which divides an interior of the exhaust gas aftertreatment container, in which exhaust gas flows, from an exterior of the exhaust gas aftertreatment container, where preferably no exhaust gas flows. It is nevertheless also possible that the exhaust gas aftertreatment element container itself is arranged in a larger container in which optionally exhaust gas can also flow. In this case, the outer wall is not a final wall to the surroundings in which no exhaust gas flows, but rather an outer wall in the more precise sense of the exhaust gas aftertreatment container itself which has the plug-in receivers and thus also serves to retain and fasten the interchangeable plug-in modules.

If the exhaust gas aftertreatment container has such plug-in receivers on precisely one and preferably only one side or on precisely one outer wall, it can only be fitted from one side so that in particular the other side of the exhaust gas aftertreatment container can be arranged so as to be inaccessible. This can have advantages in terms of mounting and/or installation of the exhaust gas aftertreatment container.

It is alternatively provided that the exhaust gas aftertreatment container has plug-in receivers for interchangeable plug-in modules on two opposite outer walls or on two opposite sides. The interchangeable plug-in modules can then be plugged in from two sides into the exhaust gas aftertreatment container. This can be sealed off as a result in a particularly expedient manner and/or can have a particularly short and installation space-saving design.

If the exhaust gas aftertreatment container has installation receivers for interchangeable plug-in modules on precisely one outer wall, this is particularly preferably used with interchangeable plug-in modules which have at least two exhaust gas aftertreatment elements which are arranged spaced apart from one another, as seen in the longitudinal direction, wherein they furthermore have an inflow chamber, which is open at the edge, between the exhaust gas aftertreatment elements. Such interchangeable plug-in modules can simply be plugged in from only one side into the exhaust gas aftertreatment container. If the exhaust gas aftertreatment container has plug-in receivers for interchangeable plug-in modules on two opposite outer walls, it is in contrast preferably used with interchangeable plug-in modules, to which in each case precisely one exhaust gas aftertreatment element or a multiplicity of exhaust gas aftertreatment elements are assigned without an inflow chamber arranged therebetween. Such interchangeable plug-in modules can then be plugged in from different sides into the exhaust gas aftertreatment container.

The flow guiding chamber is preferably provided centrally in the exhaust gas aftertreatment container, wherein in particular the exhaust gas is initially guided through the exhaust gas inlet and the exhaust gas guiding pipe centrally into the central flow guiding chamber from which it is divided along the two directions of flow between the different exhaust gas aftertreatment elements and is guided in particular towards opposite sides, in particular ends, of the exhaust gas aftertreatment container.

According to one further development of the invention, it is provided that at least one exhaust gas aftertreatment element is formed as a catalytic converter for selective catalytic reduction of nitrogen oxides (SCR catalytic converter). In this case, a metering device for at least one reducing agent is assigned to the exhaust gas inlet. The metering device can be configured in particular for metering a urea/water solution which is mixed with the hot exhaust gas and evaporated, wherein ammonia is generated which is converted at the SCR catalytic converter with nitrogen oxides to form nitrogen and water. In particular in this case, the exhaust gas guiding pipe is preferably formed as a mixing section and/or preparation section.

The metering device is preferably arranged on the exhaust gas inlet or externally in relation to the exhaust gas aftertreatment container, wherein it is then arranged in particular upstream of the exhaust gas inlet. Due to the fact that the metering device is assigned to the exhaust gas inlet, a mixing section for the reducing agent is realized from the exhaust gas inlet into the flow guiding chamber so that good mixing and evaporation as well as, where applicable, a conversion of a reducing agent precursor product up to the flow guiding chamber are ensured. This improves the efficiency of the selective catalytic reduction of nitrogen oxides in the at least one exhaust gas aftertreatment element.

According to one further development of the invention, it is provided that the exhaust gas aftertreatment system has a mixing chamber which is arranged outside the exhaust gas aftertreatment container upstream of the exhaust gas inlet, wherein the mixing chamber is in fluid connection with the exhaust gas inlet. In this manner, the functions of a mixing of a reducing agent and/or a swirl generation for the exhaust gas for advantageous exhaust gas flow and the actual exhaust gas aftertreatment in the exhaust gas aftertreatment container can advantageously be separated from one another so that the exhaust gas aftertreatment container itself is embodied in a shortened design and can thus be configured in an installation space-saving manner.

According to one configuration, a metering device for a reducing agent is preferably assigned to the mixing chamber, wherein the mixing chamber then serves in particular to mix the reducing agent with exhaust gas.

It is alternatively or additionally preferably provided that the mixing chamber has a cylindrical form, in particular with a round, preferably circular cross-section, wherein the mixing chamber has a tangentially oriented exhaust gas inlet opening as well as preferably an axially oriented exhaust gas outlet opening. The tangentially oriented exhaust gas inlet opening is preferably arranged on an outer circumference of the mixing chamber, wherein the axially oriented exhaust gas outlet opening is arranged preferably centrally, in particular centrally on the mixing chamber. As a result of the arrangement described here of the exhaust gas inlet opening on one hand and the exhaust gas outlet opening on the other hand, a swirling of the exhaust gas in the mixing chamber and in particular a circular or spiral flow guidance are possible, which is particularly expedient and leads in particular to a very good mixing of the exhaust gas with the reducing agent.

The mixing chamber preferably has a diameter which is greater than an extent of the mixing chamber in the axial direction. The mixing chamber is therefore formed overall in particular as a circular disk or has an oblate form.

Alternatively or additionally, the mixing chamber preferably has a swirl-generation device which is configured to generate a swirl in the exhaust gas flow by the mixing chamber. As a result of this, in particular the mixing of the exhaust gas with a reducing agent can be yet further improved. The swirl-generation device preferably has at least one swirl plate which is arranged in the mixing chamber in such a manner that swirl of the exhaust gas flowing onto the swirl plate is brought about.

According to one configuration, it is provided that the mixing chamber for the exhaust gas which is flowing in provides an abrupt cross-sectional expansion in the region of the inlet opening. As a result of this volatile expansion of the flow cross-section, the mixing of the exhaust gas with reducing agent can additionally be improved.

The invention also includes structural measures which can be taken in addition or alternatively to the measures already described in order to improve, in particular optimize, an equal distribution of the exhaust gas mass flow to the exhaust gas aftertreatment elements. Such measures include at least one measure, selected from a group comprising varying dimensions of the exhaust gas guiding pipe, making a perforation for the passage of exhaust gas, in particular on the exhaust gas guiding pipe and/or on the exhaust gas aftertreatment elements, providing at least one flow guiding element, in particular a cone or flow guiding plate, various volumes for the exhaust gas aftertreatment elements and/or the outlet chambers, generally for the different flow paths, various lengths of the different flow paths, and various lengths for different exhaust gas aftertreatment elements assigned to different directions of flow, in particular to influence a pressure loss coefficient. Overall, it is therefore possible to take active measures, in particular by corresponding construction of the exhaust gas aftertreatment system, to improve the even distribution of the exhaust gas mass flow.

The exhaust gas aftertreatment system represents a scalable modular system which can be adapted flexibly to different applications, in particular to different internal combustion engines.

An improvement and/or integration of inserted noise insulation is also possible in the case of the exhaust gas aftertreatment system.

The object is also achieved in that an internal combustion engine is created which has an exhaust gas aftertreatment system according to any one of the exemplary embodiments described above. At least one exhaust gas outlet of an engine block of the internal combustion engine, in particular an exhaust gas collector or exhaust manifold, is preferably in fluid connection with the exhaust gas inlet of the exhaust gas aftertreatment system. In the context of the internal combustion engine, advantages are also achieved which have already been explained in the context of the exhaust gas aftertreatment system.

The internal combustion engine is preferably formed as a reciprocating piston engine. It is possible that the internal combustion engine is configured to power a car, an HGV or a commercial vehicle. In the case of one preferred exemplary embodiment, the internal combustion engine serves to power in particular heavy land vehicles or watercraft, for example, mining vehicles, trains, wherein the internal combustion engine is used in a locomotive or a power car, or ships. Use of the internal combustion engine to power a defense-related vehicle, for example, a tank, is possible. One exemplary embodiment of the internal combustion engine is preferably also used in a stationary manner, for example, for stationary energy supply in emergency power operation, steady load operation or peak load operation, wherein the internal combustion engine preferably powers a generator in this case. A stationary application of the internal combustion engine for powering auxiliary assemblies, for example, fire extinguishing pumps on oil rigs, is possible. An application of the internal combustion engine in the field of conveying fossil raw materials and in particular fuels, for example, oil and/or gas, is furthermore possible. Use of the internal combustion engine in the industrial sector or in the construction sector, for example in a construction or building machine, for example in a crane or a digger, is possible. The internal combustion engine is preferably formed as a diesel engine, as a petrol engine, as a gas engine for operation with natural gas, biogas, special gas or another suitable gas. In particular if the internal combustion engine is formed as a gas engine, it is suitable for use in a combined heat and power plant for stationary energy generation.

BRIEF DESCRIPTION OF THE DRAWING

The invention is explained in greater detail below on the basis of the drawing. In the drawing

DETAILED DESCRIPTION OF THE INVENTION

Figure 1:
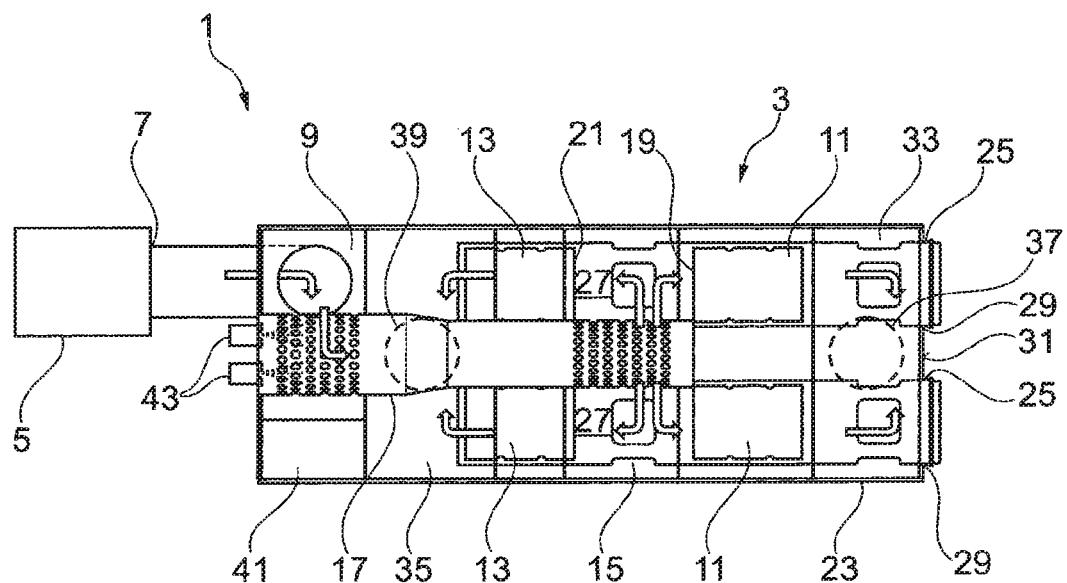
FIG. 1 shows a schematic representation of a first exemplary embodiment of an internal combustion engine with an exhaust gas aftertreatment system.

FIG. 1 shows a schematic representation of a first exemplary embodiment of an internal combustion engine 1 with an exhaust gas aftertreatment system 3, wherein an engine block 5 of internal combustion engine 1 has an exhaust gas outlet 7 which is in fluid connection with an exhaust gas inlet 9 of exhaust gas aftertreatment system 3. Exhaust gas aftertreatment system 3 has at least two exhaust gas aftertreatment elements 11, 13, wherein the exemplary embodiment represented here has a total of eight exhaust gas aftertreatment elements 11, 13, of which only four are represented in the longitudinal sectional view represented in FIG. 1. Of these, in turn only two exhaust gas aftertreatment elements 11, 13 are discussed in detail below because precisely the same mode of operation is apparent for all different exhaust gas aftertreatment elements 11, 13 and in this regard only a multiplication of the concept and the mode of operation of exhaust gas aftertreatment system 3 is produced.

Exhaust gas aftertreatment system 3 furthermore has a flow guiding chamber 15.

Exhaust gas inlet 9, the at least two exhaust gas aftertreatment elements 11, 13 and flow guiding chamber 15 are arranged relative to one another and fluid-connected to one another such that exhaust gas flowing through exhaust gas inlet 9 into flow guiding chamber 15 is divided between the at least two exhaust gas aftertreatment elements 11, 13, wherein the exhaust gas passes through a first exhaust gas aftertreatment element 11 of the at least two exhaust gas aftertreatment elements 11, 13 along a first direction of flow, from left to right in FIG. 1, wherein the exhaust gas passes through at least a second exhaust gas aftertreatment element 13 of the at least two exhaust gas aftertreatment elements 11, 13 along a second direction of flow, from right to left in FIG.

1, wherein the first direction of flow and the second direction of flow are oriented in an antiparallel manner here, i.e. opposite to one another.

The exhaust gas flowing into flow guiding chamber 15 is therefore partially deflected and guided back here counter to the direction of inward flow through second exhaust gas aftertreatment element 13, wherein a different part of the exhaust gas passes through first exhaust gas aftertreatment element 11 substantially in the direction of inward flow.

As a result of the concept proposed here, a catalytic converter volume of exhaust gas aftertreatment elements 11, 13 can be increased, in particular doubled, without a pressure loss via exhaust gas aftertreatment elements 11, 13 increasing. On the contrary, the incoming flow surface of exhaust gas aftertreatment elements 11, 13 is increased overall, in particular doubled, in a very efficient manner.

Exhaust gas inlet 9 is in fluid connection here with flow guiding chamber 15 via an exhaust gas guiding pipe 17, wherein exhaust gas aftertreatment elements 11, 13 have in each case an exhaust gas inlet 19, 21 facing flow guiding chamber 15, wherein a first exhaust gas inlet 19 is arranged on one side of flow guiding chamber 15, and wherein a second exhaust gas inlet 21 is arranged on a second side of flow guiding chamber 15 opposite the first side.

Exhaust gas aftertreatment system 3 has an exhaust gas aftertreatment container 23 which itself has exhaust gas inlet 9, exhaust gas aftertreatment elements 11, 13 and flow guiding chamber 15.

In the case of the exemplary embodiment represented here, exhaust gas aftertreatment container 23 has a multiplicity of interchangeable plug-in modules 25, wherein in each case two exhaust gas aftertreatment elements are arranged in an interchangeable plug-in module 25, namely spaced apart from one another, as seen in the longitudinal direction of interchangeable plug-in module 25, wherein interchangeable plug-in modules 25 have in each case an inflow chamber 27 which is open at the edge in regions between exhaust gas aftertreatment elements 11, 13. Inflow chamber 27 is in fluid connection with flow guiding chamber 15 in the mounted state of interchangeable plug-in module 25. In particular interchangeable plug-in module 25 is arranged in exhaust gas aftertreatment container 23 in such a manner that inflow chamber 27 is arranged in flow guiding chamber 15.

Exhaust gas aftertreatment container 23 has here installation receivers 29 on precisely one and only one side or on precisely one and only one outer wall 31.

Exhaust gas aftertreatment container 23 furthermore has two separate outlet chambers 33, 35, wherein exhaust gas, which has flowed through first exhaust gas aftertreatment elements 11, reaches first outlet chamber 33 and wherein exhaust gas, which has flowed through second exhaust gas aftertreatment elements 13, reaches second outlet chamber 35. An exhaust gas outlet 37, 39 is assigned to each outlet chamber 33, 35, wherein exhaust gas can escape from first outlet chamber 33 through first exhaust gas outlet 37, wherein exhaust gas can escape from second outlet chamber 35 through second exhaust gas outlet 39 from exhaust gas aftertreatment container 23.

Exhaust gas aftertreatment container 23 furthermore has an integrated mixing chamber 41 which is assigned here to exhaust gas inlet 9 as a tangential inflow opening, wherein exhaust gas guiding pipe 17 opens into integrated mixing chamber 41, wherein the exhaust gas can flow through bores, which are open at the edge, of exhaust gas guiding pipe 17 into this, and wherein exhaust gas guiding pipe 17 is configured here as an axial exhaust gas outlet opening for integrated mixing chamber 41.

Here, two metering devices 43 for a reducing agent are assigned to integrated mixing chamber 41, by which metering devices 43 a reducing agent or a reducing agent precursor product, in particular a urea/water solution, can be metered into integrated mixing chamber 41. Exhaust gas aftertreatment elements 11, 13 are corresponding preferably formed as SCR catalytic converters.

The following flow of the exhaust gas through exhaust gas aftertreatment container 23 is produced overall: the exhaust gas flows through exhaust gas inlet 9 into integrated mixing chamber 41 and is mixed there with the reducing agent. It now flows radially into exhaust gas guiding pipe 17 and through it into flow guiding chamber 15. It is divided there between exhaust gas aftertreatment elements 11, 13, wherein it is divided in particular into directions of flow oriented in an antiparallel manner to one another. It passes from exhaust gas aftertreatment elements 11, 13 into outlet chambers 33, 35 and from there via exhaust gas outlets 37, 39 out of exhaust gas aftertreatment container 23.

Figure 2:
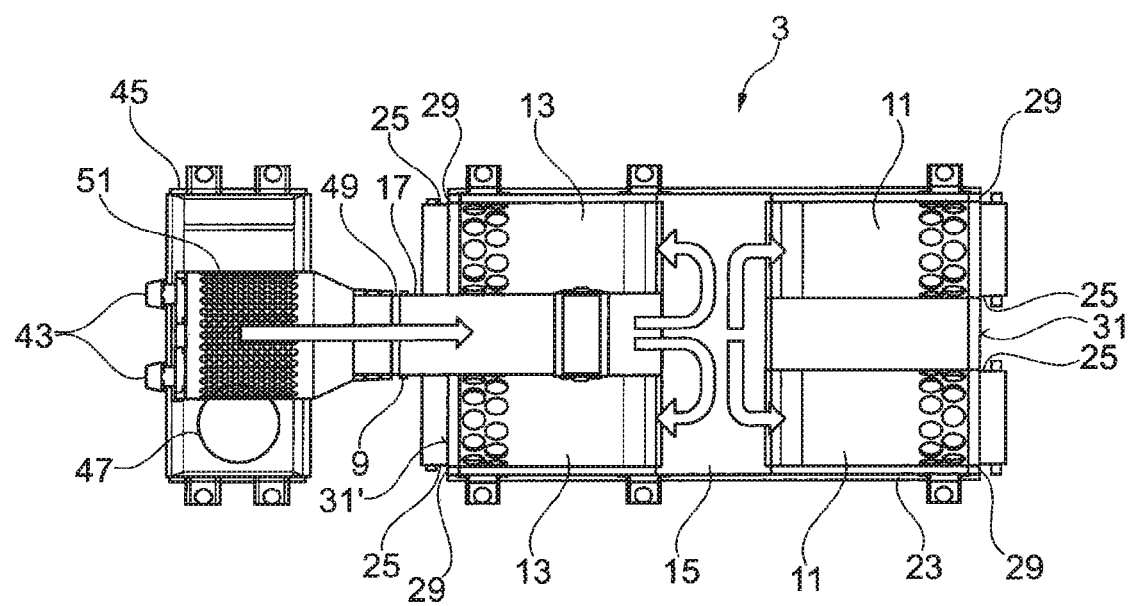
FIG. 2 shows a schematic representation of a second exemplary embodiment of an exhaust gas aftertreatment system.

FIG. 2 shows a schematic representation of a second exemplary embodiment of exhaust gas aftertreatment system 3. Identical elements and elements with identical functions are provided with the same reference numbers, hence reference is made to the above description. Exhaust gas aftertreatment container 23 has here a multiplicity of interchangeable plug-in modules 25, wherein each of interchangeable plug-in modules 25 has precisely one and only one exhaust gas aftertreatment element 11, 13. Plug-in receivers 29 for interchangeable plug-in modules 25 are correspondingly provided on exhaust gas aftertreatment container 23 on two opposite sides, in particular on two opposite outer walls 31, 31' of exhaust gas aftertreatment container 23. Interchangeable plug-in modules 25, which have exhaust gas aftertreatment elements 11, 13 which are assigned to one another in pairs and are in particular arranged opposite one another, are therefore plugged in from opposite sides into exhaust gas aftertreatment container 23, wherein they open into flow guiding chamber 15 and are opposite one another there. This improves a sealing of exhaust gas aftertreatment container 23 and leads to it having a shorter design.

Exhaust gas guidance pipe 17 is integrated fixedly here into exhaust gas aftertreatment container 23, wherein exhaust gas inlet 9 is provided directly on exhaust gas guiding pipe 17.

The second exemplary embodiment, represented here, of exhaust gas aftertreatment system 3 has a separate mixing chamber 45 which is arranged externally of and outside exhaust gas aftertreatment container 23, is arranged upstream of exhaust gas inlet 9 and is in fluid connection thereto. Here, two metering devices 43 for a reducing agent or a reducing agent precursor product, in particular for a urea/water solution, are assigned to mixing chamber 45.

Mixing chamber 45 has a cylindrical, oblate form, wherein it has a round, in particular circular cross-section. It furthermore has a tangentially oriented exhaust gas inlet opening 47 as well as an axially oriented exhaust gas outlet opening 49 which is connected to exhaust gas inlet 9. Exhaust gas flowing into mixing chamber 45 tangentially through exhaust gas inlet opening 47 is thus brought into a circular or substantially circular flow which is expedient for mixing and evaporation of the reducing agent with and in the exhaust gas. Axial exhaust gas outlet opening 49 is part of an outlet pipe 51 which extends axially into mixing chamber 45 and in this has a multiplicity of recesses which are open at the edge and through which the exhaust gas can flow in the radial direction into outlet pipe 51 and can be deflected there in the axial direction in order to finally leave mixing chamber 45 via outlet pipe 41 in the axial direction.

The mixing chamber is, in particular as a result of its cylindrical configuration, preferably rotatable about its axial direction which significantly facilitates its installation and in particular its fastening to an internal combustion engine. As a result of this, this can be matched in particular in a simple manner to an outlet of an exhaust gas turbocharger housing on the internal combustion engine without the need for a modification of the arrangement of the exhaust gas turbocharger housing or intermediate pipework.

Figure 3:
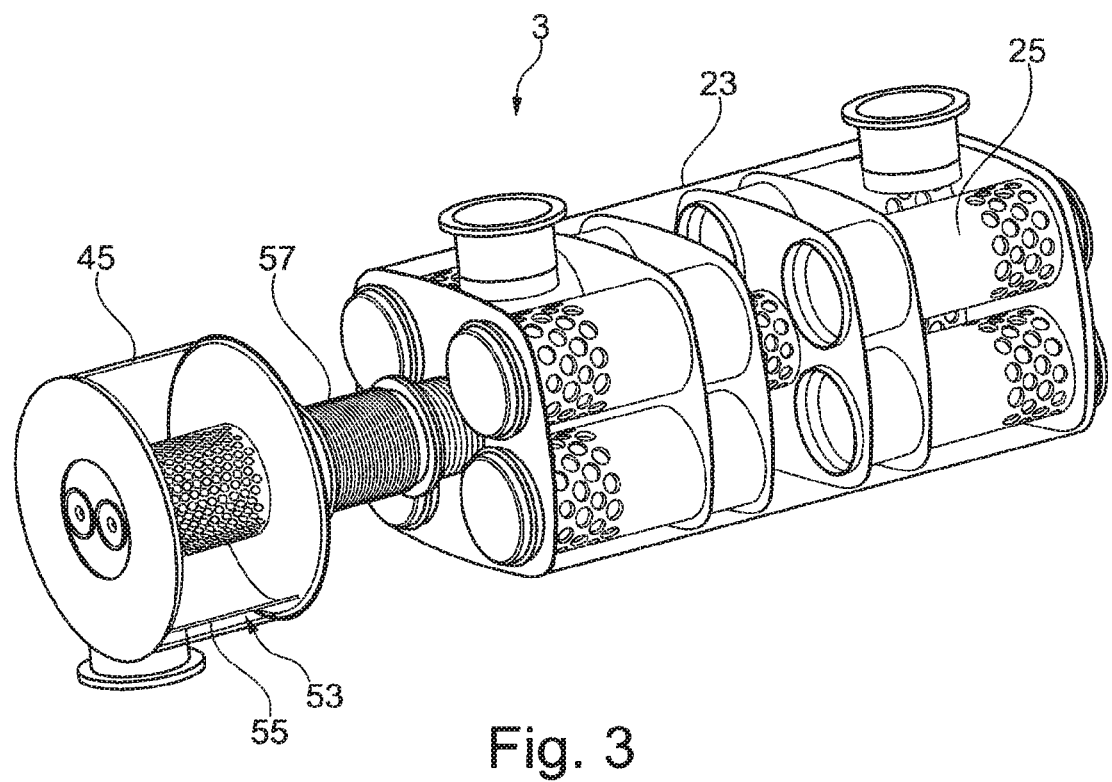
FIG. 3 shows a further representation of the second exemplary embodiment according to FIG. 2.

FIG. 3 shows a second view of the second exemplary embodiment of exhaust gas aftertreatment system 3 according to FIG. 2. Identical elements and elements with identical functions are provided with the same reference numbers so that in this regard reference is made to the above description. It is represented in FIG. 3 that mixing chamber 45 has a swirl-generation device 53 for generating a swirl in the exhaust gas flow, wherein the swirl-generation device preferably has at least one swirl plate 55. The generation of a swirl in the exhaust gas flow has in particular advantages in terms of a as homogeneous as possible distribution of the reducing agent and its efficient evaporation in the exhaust gas flow.

It is also apparent in FIG. 3 that folding bellows 57 for compensating tolerances, vibrations and/or thermal expansion can be arranged between mixing chamber 45 and exhaust gas aftertreatment container 23.

The second exemplary embodiment according to FIGS. 2 and 3 furthermore has the advantage that exhaust gas aftertreatment container 23 only has to be configured and constructed once for a plurality of different internal combustion engines, wherein it can then be combined with different mixing chambers 45.

Vice versa, mixing chamber 45 can alternatively or additionally be configured and constructed for a plurality of internal combustion engines 1, wherein this can then be combined with a plurality of different exhaust gas aftertreatment containers 23.

It has been shown overall that in particular a catalytic converter volume can be significantly increased without pressure loss or in the case of low pressure loss by means of exhaust gas aftertreatment system 3 proposed here and internal combustion engine 1, wherein, in particular as a result of the concept, an enlarged incoming flow surface, preferably a doubled incoming flow surface, is provided.

The invention claimed is:

1. An exhaust gas aftertreatment system, comprising:
an exhaust gas inlet;
at least two exhaust gas aftertreatment elements;
a flow guiding chamber,
wherein the exhaust gas inlet, the at least two exhaust gas aftertreatment elements and the flow guiding chamber are arranged relative to one another and fluid-connected to one another so that exhaust gas flowing through the exhaust gas inlet into the flow guiding chamber is dividable between the at least two exhaust gas aftertreatment elements, wherein the exhaust gas passes through at least a first of the at least two exhaust gas aftertreatment elements along a first direction of flow, wherein the exhaust gas passes through at least a second of the at least two exhaust gas aftertreatment elements along a second direction of flow, wherein the first direction of flow and the second direction of flow are oriented at least obliquely to one another; and
an exhaust gas aftertreatment container which has the exhaust gas inlet, the at least two exhaust gas aftertreatment elements and the flow guiding chamber, wherein the exhaust gas aftertreatment container has at least one interchangeable plug-in module which has the at least two exhaust gas aftertreatment elements which are arranged spaced apart from one another, as seen in a longitudinal direction of the interchangeable plug-in module, wherein the interchangeable plug-in module has an inflow chamber between the longitudinally spaced exhaust gas aftertreatment elements, the inflow chamber being open at an edge in regions.

2. The exhaust gas aftertreatment system according to claim 1, wherein the first direction of flow and the second direction of flow are anti-parallel to one another.

3. The exhaust gas aftertreatment system according to claim 1, wherein the at least two exhaust gas aftertreatment elements have in each case an exhaust gas inlet facing the flow guiding chamber, wherein a first exhaust gas inlet of a first exhaust gas aftertreatment element is arranged on a first side of the flow guiding chamber, wherein a second exhaust gas inlet of a second exhaust gas aftertreatment element is arranged on a second side of the flow guiding chamber opposite the first side.

4. The exhaust gas aftertreatment system according to claim 1, wherein the exhaust gas aftertreatment container has plug-in receivers for interchangeable plug-in modules on precisely one outer wall or on two opposing outer walls.

5. The exhaust gas aftertreatment system according to claim 1, wherein at least one exhaust gas aftertreatment element of the at least two exhaust gas aftertreatment elements is formed as an SCR catalytic converter, wherein a metering device for a reducing agent is assigned to the exhaust gas inlet.

6. The exhaust gas aftertreatment system according to claim 1, further comprising a mixing chamber arranged outside the exhaust gas aftertreatment container upstream of the exhaust gas inlet, wherein the mixing chamber is in fluid connection with the exhaust gas inlet, wherein
a) a metering device for reducing agent is assigned to the mixing chamber, and/or wherein
b) the mixing chamber has a cylindrical form and a tangentially oriented inlet opening as well as an axial exhaust gas outlet opening, and/or wherein
c) the mixing chamber has a swirl generation device for generation of a swirl in the exhaust gas flow which passes through the mixing chamber.

7. An internal combustion engine, comprising an exhaust gas aftertreatment system according to claim 1.

* * * * *